United States Patent [19]

Gotoh et al.

[11] Patent Number: 4,880,260
[45] Date of Patent: Nov. 14, 1989

[54] METHOD OF JOINING PIPES

[75] Inventors: Taiji Gotoh; Hidetoshi Yamamoto; Kiyoshi Yamada, all of Kuwana, Japan

[73] Assignee: Mie Hooro Co., Ltd., Kuwana, Japan

[21] Appl. No.: 140,170

[22] Filed: Dec. 31, 1987

[51] Int. Cl.[4] ............................................. F16L 13/14
[52] U.S. Cl. .................................. 285/382.2; 285/424; 29/517; 29/521
[58] Field of Search ............... 285/382.2, 382.1, 382.7, 285/334.5, 382, 414; 29/508, 517, 521

[56] References Cited

U.S. PATENT DOCUMENTS

| 3,632,141 | 1/1972 | Larsson ...................... 285/382.7 X |
| 3,827,727 | 8/1974 | Moebius . |
| 3,915,480 | 10/1975 | Kish et al. ..................... 285/382 X |
| 4,018,462 | 4/1977 | Saka . |
| 4,541,655 | 9/1985 | Hunter ......................... 285/382.2 X |

FOREIGN PATENT DOCUMENTS

| 899937 | 5/1972 | Canada ............................. 285/362.2 |
| 0160758 | 8/1984 | European Pat. Off. . |
| 2719882 | 11/1978 | Fed. Rep. of Germany ... 285/382.2 |
| 2814700 | 10/1979 | Fed. Rep. of Germany ...... 285/382 |
| 204387 | 4/1982 | Japan . |

Primary Examiner—Dave W. Arola
Attorney, Agent, or Firm—Collard, Roe & Galgano

[57] ABSTRACT

A method of joining a pair of pipes is disclosed. The method includes forming one of the pipes with an enlarged diameter near one end thereof. A radially-outwardly flared section widens from the enlarged diameter toward the end of the pipe. An elastic gasket and a C-shaped rigid ring are placed in the flared section. A second pipe is then inserted inside the enlarged section of the first pipe. The outer pipe is then inwardly deformed by the action of a pressure member, such as the die, applied to the exterior of the outer pipe in the region of the pipe overlap. The free end of the outer pipe deforms plastically inwardly toward the inserted pipe thereby compressing the gasket into sealing engagement between the two pipes and compressing the C-shaped ring. As the C-shaped ring is compressed, the outer pipe is deformed into the inserted pipe so that the ring is engaged by the inner wall of the outer pipe and is wedged into the outer wall of the inserted pipe.

6 Claims, 3 Drawing Sheets

METHOD OF JOINING PIPES

BACKGROUND OF THE INVENTION

1. Field of the Invention

This invention relates to a method of joining pipes, which is especially suited for joining thin wall metal pipes.

2. Description of the Prior Art

In prior art methods of joining pipes, which can be easily carried out at a factory site, one of two pipes to be joined together is formed with an outwardly tapered joint or a flared end section having an annular gasket or the like. The other pipe is inserted into the tapered joint section thus formed such that it is embraced within the joint section.

In this prior art method, however, the two pipes are joined together along a distance which is substantially equal to the length of the tapered joint section formed on one of the pipes. Therefore, the joint obtained after completion of the joining operation is relatively short and is weak with respect to bending forces and is liable to be bent into a V-shaped form by an external force applied to the joint in a direction normal to the pipe axis.

This bending has been inevitable because of the large lengths of pipes joined together. However, leakage of a fluid or intrusion of water from the outside may occur at the bent joint, so that there has been a need for solving this problem by the formation of a stronger joint.

The present invention is intended to solve the above problem, and it seeks to provide an improved method of joining pipes. An elastic gasket ring and a C-shaped metal ring are provided on the inner surface of a tapered joint section on one of the two pipes to be joined together. The pipe joint section having the tapered portion flares outwardly toward the pipe end. The pipe to be inserted into the flared portion is provided with a generally straight end section adapted to be received within an enlarged section on the pipe having the tapered joint section. This enlarged section is adjacent the inward end of the tapered joint section. The end portion of the pipe to be inserted into the tapered joint section is inserted until the end reaches an engagement portion or stop on the inside of the enlarged section of the flared pipe. Two split die halves having working sections with tapered surfaces are placed face to face such as to embrace a portion of the inserted pipe adjacent to the end thereof and the tapered joint section. The split die halves are moved along the pipe axis toward each other to cause a portion of the tapered joint section adjacent the free end thereof to be plastically deformed by bending or contracting fashion toward the inserted pipe by the axial movement of at least one of the split die halves. This reduction in diameter thereby causes compression of the elastic gasket ring thereby obtaining a seal effect. The reduction in diameter also causes compression of the C-shaped metal ring. The ring is compressed by the inner surface of the bent or contracted portion of the tapered joint section adjacent the end thereof. Thus, the inner diameter of the compressed C-shaped metal ring wedges into the wall of the inserted pipe end and the outer diameter of the compressed C-shaped metal ring engages the now inclined inner surface at the end portion of the tapered joint section.

SUMMARY OF THE INVENTION

It is an object of this invention to provide a method for quickly and easily joining metal pipes.

It is a further object of this invention to provide a method for joining thin wall pipes which can be carried out in a factory.

It is yet one additional object to provide a simple and economical method of joining pipes which produces a joint able to resist bending forces.

Accordingly, a method of joining pipes is set forth. This method comprises the steps of providing an elastic gasket ring and a C-shaped metal ring on the inner surface of a tapered joint section in a first of two pipes to be joined together. The tapered joint section has a tapered portion flaring outwardly toward the pipe end. The pipe to be inserted is provided with a section having an end portion. The end portion of the pipe is inserted into an enlarged diameter section on the first pipe adjacent to the tapered joint section until the end reaches an engagement portion or stop. Two split die halves having working sections with tapered surfaces are disposed face to face such as to embrace a portion of the inserted pipe adjacent to the end thereof and said tapered joint section. The split die halves are moved along the pipe axis toward each other to cause a portion of the tapered joint section adjacent the free end thereof to be plastically deformed by bending inwardly or in a contracted fashion toward the inserted pipe by the movement of at least one of said split die halves. This action causes compression of the elastic gasket ring and thus providing a seal effect as well as causing compression of said C-shaped metal ring. The ring is compressed by the movement of the inner surface of the bent or contracted portion of the tapered joint section adjacent to the end thereof so that the inner end of the compressed C-shaped metal ring wedges into the wall of the inserted pipe. The outer end of said compressed C-shaped metal ring engages the inclined inner surface of an end portion of said tapered joint section.

These and other objects and advantages of the present invention will become apparent from the following description of the accompanying drawings, which disclose several embodiments of the present invention. It is to be understood that the drawings are to be used for the purpose of illustration only, and not as a definition of the invention.

DESCRIPTION OF THE PREFERRED EMBODIMENTS

Figure 1:
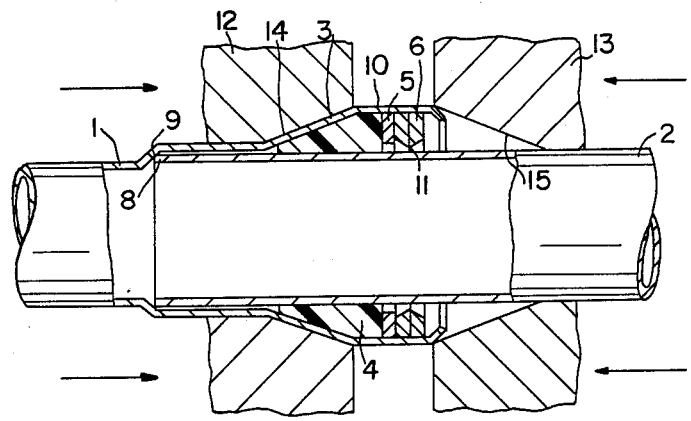
FIG. 1 is a sectional view showing a main pipe and another pipe inserted therein but before being joined thereto.

Now, several embodiments of the invention will be described with reference to FIGS. 1–6. The invention may be utilized with a stainless steel pipe having a comparatively thin wall thickness or the like. On the inner wall surface of an outwardly tapered joint section 3 of a main pipe 1 is provided an elastic gasket ring 4 for obtaining a compression seal effect. Also provided is a back-up member 5 and a C-shaped metal ring 6 for detachment prevention.

To join the main pipe 1 and a second pipe 2, the pipe 2 is inserted into the tapered joint section 3 of main pipe. Pipe 2 is inserted until the inserted end 8 thereof reaches an engagement portion or stop 9 at the end of main pipe 1 adjacent the end of enlarged diameter section 7 opposite the end of section 7 which is continuous to the inner end of tapered joint section 3.

Figure 2:
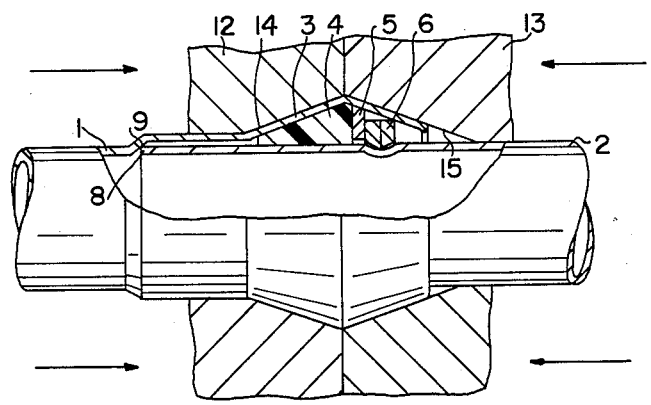
FIG. 2 is a sectional view showing the pipes joined together.

After the insertion, two split die halves 12 and 13 having tapered working surfaces 14 and 15, are disposed on pipes 1 and 2 face to face. Die 12 embraces a portion of the main pipe 1 near the flared end thereof and die 13 is adjacent to the end of the joint section 3, as shown in FIG. 1. Then, as shown in FIG. 2, the two split die halves 12 and 13 are moved in the direction of the arrows, i.e., along the pipe axis, toward each other. As the cylindrical end portion of the joint section 3 is urged by the split die half 13, it is gradually bent or deformed by reducing the cross section thereof in conformity to the inclination of the tapered surface 15.

Figure 3:
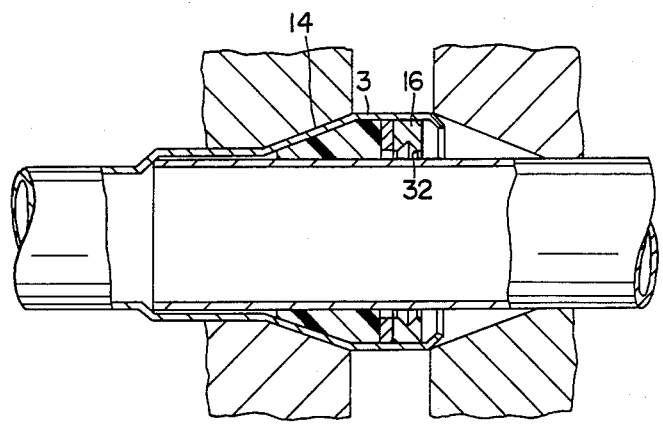
FIG. 3 is a view showing a second embodiment using a C-shaped metal ring, with a V-shaped groove.
Figure 4:
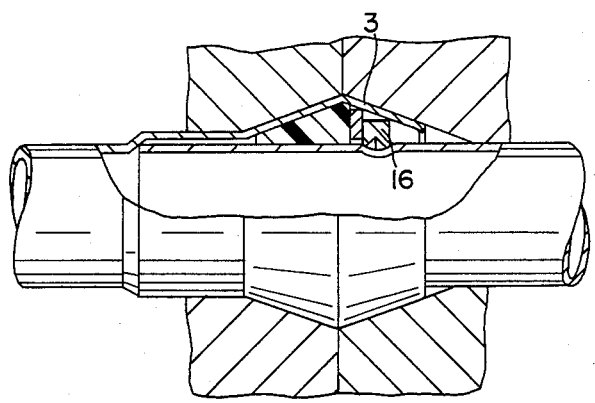
FIG. 4 is a view showing the embodiment of FIG. 3 after the pipes have been joined together.
Figure 5:
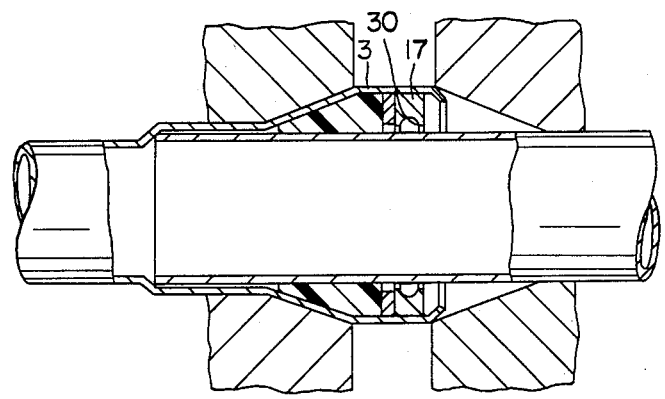
FIG. 5 is a view showing a third embodiment using a C-shaped metal ring having a semi-circular groove thereon.
Figure 6:
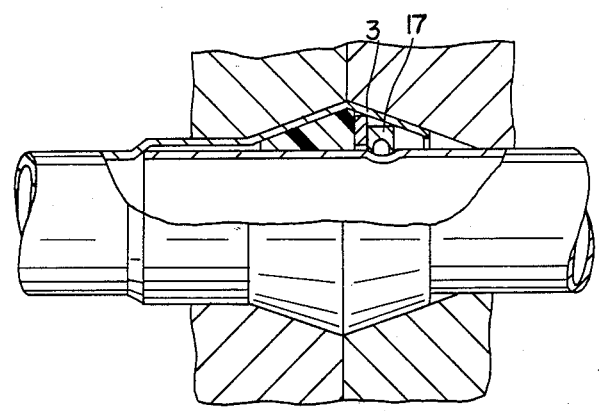
FIG. 6 is a view showing the embodiment of FIG. 5 after the pipes have been joined together.

FIGS. 3 to 6 show further embodiments of the invention. In the embodiment of FIG. 3, a C-shaped metal ring 17 having a V-shaped groove 32 is plastically deformed as shown in FIG. 4. In the embodiment of FIG. 5, a C-shaped metal ring 16 having a semi-circular groove 30 is plastically deformed as shown in FIG. 6.

When the joining operation as described above is completed, the compressed elastic gasket ring 4 provides a seal effect. At the same time, an inner diameter 11 of the C-shaped metal ring 6 which has been compressed and reduced in diameter, wedges into and deforms the wall of the pipe 2, while the outer diameter 10 is engaged in the inclined inner wall surface of the end of the now deformed tapered joint section.

In the prior art method of joining pipes, the inserted pipe is only inserted to an extent corresponding to the length of the tapered joint section 3. According to the invention, the enlarged section 7 of pipe 1 is formed in addition to the tapered joint section 3 to increase the length of the area, over which the inserted pipe 2 is supported in the main pipe 1.

Therefore, the joint section will not be bent by external force applied to it in the direction normal to the pipe axis after the two pipes have been joined together.

As has been shown, according to the invention it is possible to provide a method of joining pipes, by which a joint having high strength with respect to external forces normal to the pipe axis can be obtained.

Alternatively, it can be seen that the inserted pipe 2 can be provided with a reduced end cross section which would eliminate the need for the enlarged section 7 on pipe 1.

While several of the embodiments and examples of the present invention have been illustrated and described, it is obvious that many changes and modifications may be made thereunto, without departing from the spirit and scope of the invention.

What is claimed is:

1. A method of joining a pair of thin walled pipes comprising the steps of:
   forming one of the pipes with an enlarged diameter section near one end thereof, with a radially outwardly flared section widening from said enlarged diameter section towards said end of said one pipe;
   placing an elastic gasket and a C-shaped rigid ring in said flared section;
   inserting the other pipe inside said one pipe to extend into said enlarged section; and
   deforming, only in the area of said flared section by the action of a pressure means applied to the exterior of said one pipe in the region of pipe overlap, the free end of said one pipe plastically inwardly towards the inserted pipe, thereby compressing the gasket into sealing engagement with the two pipes and compressing the C-shaped ring as said one pipe end is deformed into the inserted pipe so that the ring, while engaged by an inner wall of said one pipe, wedges into the outer wall of said inserted pipe.

2. A method according to claim 1, wherein the flared section of said one pipe is deformed so that an endmost region is forced into an inwardly tapered shape having an inclined inner wall in engagement with the C-shaped ring.

3. A method according to claim 1, wherein the deformation of said one pipe is obtained by use of a pair of opposed die halves having tapered inner faces that are flared outwardly towards each other, the die halves being moved towards each other axially of the pipes from opposite sides of the pipe joint.

4. A pipe joint formed between a pair of thin walled co-axial pipes comprising:
   an outer pipe having a larger diameter end region in which the end region of an inner pipe is received, said end region of said outer pipe including a substantially cylindrical innermost portion of larger diameter than the main section of said outer pipe, a radially outwardly flared intermediate portion extending therefrom and an adjoining radially inwardly flared outermost portion, the inner pipe being in the first pipe and extending through said three portions;
   a resilient gasket element being compressed between the intermediate portion of said outer pipe and the adjoining portion of the inner pipe into sealing engagement; and
   a relatively rigid ring member being compressed between the outermost portion of said outer pipe and the adjoining portion of the inner pipe in a manner to be forced into the outerwall of said portion of said inner pipe adjoining said outermost portion of said outer pipe, said compression of said gasket and ring member occurring as a result of inward deformation of only said flared sections.

5. A pipe joint according to claim 4, wherein said ring member has a radially grooved inner face engaging the outer wall of the second pipe.

6. A method of joining a pair of thin walled pipes comprising the steps of:
   forming one of the pipes with an enlarged diameter section near one end thereof, and a radially outwardly flared section widening from said enlarged diameter section towards said end of said one pipe, said enlarged diameter having an inner diameter having a dimension exceeding the outer diameter of the other pipe by a predetermined amount to produce a tight fit therebetween;
   placing an elastic gasket and a C-shaped rigid ring in said flared section;

inserting the other pipe inside said one pipe to extend into said enlarged section; and deforming only in the area of said flared section, by the action of a pressure means applied to the exterior of said one pipe in the region of pipe overlap, a portion of said radially outwardly flared section adjacent to a free end thereof plastically inwardly towards the inserted pipe, thereby wedging said C-shaped rigid ring against the gasket causing a sealing engagement thereof with the two pipes and wedging the C-shaped ring into the inserted pipe so that the ring, while engaged by an inner wall of said inwardly deformed portion of said radially outwardly flared section, wedges into and deforms the outer wall of said inserted pipe.

* * * * *